United States Patent Office 3,258,315
Patented June 28, 1966

3,258,315
MONOALKYL PHOSPHORIC ACID EXTRACTION OF CESIUM AND STRONTIUM VALUES
John M. Schmitt, Oak Ridge, Tenn., assignor to the United States of America as represented by the United States Atomic Energy Commission
No Drawing. Filed Sept. 19, 1963, Ser. No. 310,177
6 Claims. (Cl. 23—312)

My invention relates generally to a method of recovering cesium and strontium values from aqueous solutions and more particularly to an improved liquid-liquid extraction process for recovering and selectively extracting cesium and strontium values from aqueous acidic solutions.

There are several basic methods of recovering cesium and strontium from aqueous solutions, including precipitation, adsorption on natural and synthetic cation-exchange materials, and liquid-liquid extraction. Under prior art liquid-liquid extraction conditions, cesium is not appreciably extracted into the organic solvents, except as the triiodide in solvents such as nitrobenzene or as the nitrate in sodium tetraphenyl boron (in hexone). However, these processes do not provide sufficiently selective extraction between cesium and strontium, and the reagents used have a limited range of applicability with limited extraction ability, particularly in the presence of large quantities of alkali and alkaline earth cations, such as are present in nuclear reactor waste solutions. Strontium has been extracted from aqueous solutions, after careful complexing and pH control with di-2-ethylhexyl phosphoric acid in tributyl phosphate diluent mixtures. Although this reagent is effective for strontium extraction, it does not extract cesium from these solutions, thereby limiting its usefulness.

It is, therefore, an object of my invention to provide an improved method of extracting cesium and strontium values from aqueous solutions.

Further, it is an object to provide a process for selectively extracting cesium or strontium values from aqueous acidic solutions.

Still another object of my invention is to provide an improved liquid-liquid extraction process for selectively extracting cesium and strontium values from aqueous solutions containing relatively high concentrations of alkali and alkaline earth cations.

Other objects and advantages of my invention will be apparent from the following description and appended claims.

In accordance with my invention I have provided a process for recovering metal values selected from the group consisting of cesium and strontium from an acidic aqueous solution containing said values which comprises contacting said solution with an organic liquid phase comprising a monoalkylphosphoric acid containing at least 12 carbon atoms, whereby said metal values are transferred to the organic liquid phase, and separating the resulting metal value-loaded organic liquid phase from the metal value-depleted aqueous solution.

Further, I have found that various monoalkylphosphoric acids containing between 12 and 17 carbon atoms will preferentially extract cesium and strontium values from aqueous solutions containing relatively high concentrations of other alkali and alkaline earth cations, such as sodium, lithium and calcium when adjusted to pH values between 1 and 5. In addition, by adjusting the pH of the aqueous solution to a value between 1 and 2, cesium will be selectively extracted by these organic acids in preference to strontium and other alkali and alkaline earth cations. As the pH value is raised to a value between 2 and 5, strontium will be selectively extracted in preference to other alkali and alkaline earth cations present in the solution.

In extracting cesium and/or strontium values in accordance with my invention, an active reagent comprising a monoalkylphosphoric acid containing at least 12 carbon atoms is diluted with a substantially water-immiscible organic diluent and contacted with the metal value-containing aqueous phase. The diluent selected should meet the usual requirements for solvent extraction diluents. Among these diluent requirements are (1) the ability to dissolve, without interfering reactions, the extractant acid and the extracted cesium or strontium complex, and (2) substantial immiscibility with the aqueous solution. A wide variety of diluents have been found suitable including the aliphatic hydrocarbons, n-decane and n-dodecane. However, because of its low cost and desirable physical properties kerosene or kerosene-type diluents, such as Amsco 185–82 available from the American Mineral Spirits Company, are preferred.

The selection of a specific monoalkylphosphoric acid extractant for the process of this invention depends on a number of factors, two of the most important factors being the solubility of the extractant reagent in the aqueous phase and the cesium and strontium extraction power of the reagent being considered. Since solubility of the organic acid in the aqueous phase generally increases with fewer carbon atoms in the chain, there is a practical lower limit of 12 carbon atoms in the chain. Suitable monoalkylphosphoric acids are those having from 12 to 17 carbon atoms, such as a monododecylphosphoric acid, a monotetradecylphosphoric acid, and a monoheptadecylphosphoric acid. Typical acids from these groups most readily available commercially and which were used in the extractions shown in the tables and examples to follow are mono(2,6,8-trimethylnonyl-4)phosphoric acid, mono(4-ethyl-1-isobutyloctyl)phosphoric acid, and mono (3,9-diethyltridecyl-6)phosphoric acid, respectively. In general, as will be shown in the following tables, both extraction power and selectivity for cesium and/or strontium values over other ions in the aqueous solution increase with longer carbon chain length of the organic acid.

Tables I and II illustrate the extraction ability and selectivity of various monoalkylphosphoric acids for cesium- and strontium-bearing aqueous nitrate solutions.

TABLE I.—CESIUM-137 TRACER EXTRACTION WITH MONOALKYLPHOSPHORIC ACIDS

Organic Phase: 0.1 M monoalkylphosphoric acids in kerosene diluent
Aqueous Phase: 0.5 M $NaNO_3$, 10 p.p.m. cesium-137
Aqueous: Organic Phase Ratio = 1

| Reagent | Equilibrium pH | Extraction Coefficient, $E_a^0$ | | Separation Factor, Cs $E_a^0$/Na $E_a^0$ |
|---|---|---|---|---|
| | | Cs | Na | |
| Monododecylphosphoric acid [mono(2,6,8-trimethylnonyl-4)-phosphoric acid]. | 1.7<br>2.4<br>3.9 | 0.44<br>0.36<br>0.30 | 0.037<br>0.048<br>0.076 | 12<br>7.5<br>3.9 |
| Monotetradecylphosphoric acid [mono(4-ethyl-1-isobutyloctyl)-phosphoric acid]. | 1.7<br>2.4<br>4.2 | 0.49<br>0.38<br>0.24 | 0.032<br>0.050<br>0.084 | 15<br>7.6<br>2.9 |
| Monoheptadecylphosphoric acid [mono(3,9-diethyltridecyl-6)-phosphoric acid]. | 1.18<br>1.68<br>1.8<br>2.5<br>4.5 | 0.57<br>0.69<br>0.68<br>0.47<br>0.23 | ------<br>------<br>0.024<br>0.040<br>0.10 | ------<br>------<br>28<br>11.7<br>2.3 |

TABLE II.—STRONTIUM-89 TRACER EXTRACTION WITH MONOALKYLPHOSPHORIC ACIDS

Organic Phase: 0.1 M monoalkylphosphoric acids in kerosene diluent
Aqueous Phase: 0.5 M NaNO₃, 10 p.p.m. strontium-89
Aqueous: Organic Phase Ratio=1

| Reagent | Equilibrium pH | Extraction Coefficient, $E_a^0$ | | Separation Factor, Sr $E_a^0$/Na $E_a^0$ |
|---|---|---|---|---|
| | | Sr | Na | |
| Monododecylphosphoric acid [mono(2,6,8-trimethylnonyl-4)-phosphoric acid]. | 1.8 | 0.5 | 0.037 | 14 |
| | 2.1 | 0.8 | 0.034 | 24 |
| | 2.5 | 1.3 | 0.048 | 27 |
| | 3.1 | 2.7 | 0.056 | 48 |
| | 3.7 | 4.5 | 0.068 | 66 |
| | 4.2 | 6.3 | 0.076 | 83 |
| | 4.6 | 7.2 | | |
| Monotetradecylphosphoric acid [mono(4-ethyl-1-isobutyloctyl)-phosphoric acid]. | 1.8 | 0.5 | 0.032 | 16 |
| | 2.2 | 0.8 | 0.040 | 20 |
| | 2.6 | 1.5 | 0.050 | 30 |
| | 3.2 | 3.3 | 0.061 | 54 |
| | 4.0 | 6.2 | 0.078 | 80 |
| | 4.8 | 8.7 | 0.094 | 93 |
| | 5.3 | 10.9 | 0.118 | 92 |
| Monoheptadecylphosphoric acid [mono(3,9-diethyltridecyl-6)-phosphoric acid]. | 1.8 | 0.5 | 0.024 | 21 |
| | 2.2 | 0.8 | 0.040 | 20 |
| | 2.6 | 1.7 | 0.040 | 42 |
| | 3.5 | 4.5 | 0.062 | 73 |
| | 4.2 | 8.8 | 0.086 | 100 |
| | 4.8 | 13.2 | 0.102 | 130 |
| | 5.0 | 12.5 | 0.118 | 110 |
| | 5.2 | 19.2 | 0.136 | 140 |

The extraction coefficient, $E_a^0$, as used in the above tables, is a measure of the extraction power of a reagent and is defined as the ratio of the concentration of particular values in the organic phase to the concentration of the same values in the aqueous phase at equilibrium. The separation factor, as used in the above tables, is a measure of the preferential separation ability of a reagent and is defined as the ratio of the extraction coefficient of the value desired to the extraction coefficient of another value present in the solution. As can be seen from the data in both Table I and the Table II, the extraction powers of the monoalkylphosphoric acid increases as the carbon chain length increases, with monoheptadecylphosphoric acids providing both the highest extraction coefficients for cesium and strontium and the highest separation factors for these values over sodium values.

Table I further indicates that a greater extraction of cesium is obtained at an equilibrium pH of less than about 2 with the separation factor dropping sharply as the pH is increased. Conversely in Table II the extraction of strontium is enhanced along with an increase in separation factors as the equilibrium pH increases from about 1.8 to over 5. The effect of both initial pH and equilibrium pH on the extraction of cesium is further illustrated in the following Table III.

TABLE III.—CESIUM EXTRACTION AS A FUNCTION OF pH

Organic Phase: 0.5 M monoheptadecylphosphoric acid [mono(3,9-diethyltridecyl-6)-phosphoric acid] in kerosene diluent (Amsco 125-82)
Aqueous Phase: ΣNa=0.5 M (NaNO₃-NaOH); 0.1 g. Cs/liter; cesium-134 tracer
Aqueous: Organic Phase Ratio=3
Contact Time=10 mins.

| pH | | Extraction Coefficient, $E_a^0$ | | Separation Factor, Cs $E_a^0$/Na $E_a^0$ |
|---|---|---|---|---|
| Initial | Equil. | Cs | Na | |
| 1.0 | 1.0 | 1.9 | 0.048 | 40 |
| 2.7 | 1.6 | 2.4 | 0.10 | 24 |
| 4.1 | 1.7 | 2.4 | 0.11 | 22 |
| 5.8 | 1.65 | 2.4 | 0.11 | 22 |
| 10.9 | 1.75 | 2.4 | 0.12 | 20 |
| 11.7 | 4.7 | 0.66 | 0.44 | 1.5 |

In Table III the Cs-Na separation factor decreases with an increase in initial pH, but a separation factor of over 20 is maintained up to an initial pH of over 10 so long as the equilibrium pH is below about 1.75. The cesium extraction coefficient remains about the same at equilibrium pH values below 2 and drops sharply at higher equilibrium pH values.

The concentration of monoalkylphosphoric acid in the organic phase is not critical and may be varied over a wide range. In general, the cesium or strontium extraction coefficient increases with an increase in extractant concentration. The upper limit of the extractant concentration is determined by the solubility of the extractant in the organic diluent. The lower limit is determined generally by the desired metal value-loading in the organic phase. Suitable extractant reagent concentrations are from below 0.1 molar to over 1.0 molar. In the case of cesium, the extraction coefficient is proportional to the first power of the monoheptadecylphosphoric acid concentration, as shown in Table IV below.

TABLE IV.—CESIUM EXTRACTION AS A FUNCTION OF REAGENT CONCENTRATION

Organic Phase: monoheptadecylphosphoric acid [mono(3,9-diethyl tridecyl-6)-phosphoric acid] in kerosene diluent (Amsco 125-82)
Aqueous Phase: 1 M NaNO₃, cesium-134 tracer
Aqueous: Organic Phase Ratio=3
Contact Time=10 mins.

| Reagent Concentration, M | Equilibrium pH | Cs Extraction Coefficient, $E_a^0$ |
|---|---|---|
| 0.1 | 2.0 | 0.18 |
| 0.2 | 1.7 | 0.37 |
| 0.5 | 1.4 | 0.96 |
| 1.0 | 1.2 | 1.9 |
| 1.5 | 1.1 | *2.3 |
| 2.0 | 1.0 | *3.4 |

*Emulsion (precipitation).

In Table IV the cesium extraction coefficient increases with increasing monoheptadecylphosphoric acid concentration up to about 1 molar, at which concentration some precipitation takes place and phase separation is not sufficiently rapid.

The ratio of the volume of aqueous phase to the volume of organic phase may be varied over a wide range and is not critical. Suitable phase ratios may be from less than 1 volume of aqueous phase per volume of organic phase up to 20 volumes of aqueous phase per volume of organic phase. Neither the contact time nor temperature at which the cesium- and/or strontium-containing aqueous phase is contacted with a monoalkylphosphoric acid extractant is critical, and I prefer to carry out the extraction at about room temperature with approximately 10 minutes' contact between the phases.

After the extraction step, the cesium- and/or strontium-loaded extractant is contacted with an aqueous phase containing a stripping agent, and, in the preferred embodiment of my invention, the loaded extractant is contacted with an acid stripping agent, such as nitric acid, in concentrations of between about 1.0 and 2.0 molar.

In both the extraction step and the stripping step, any suitable liquid-liquid contacting means such as a mixer-settler device or an extraction column may be used.

Using the method of my invention, useful extractions of cesium and strontium may be obtained in the presence of high concentrations of anions usually present in nuclear reactor waste solutions, including nitrate, chloride, sulfate and phosphate, in concentrations up to at least 0.5 molar. As previously noted, high concentrations of alkali and alkaline earth cations can be present in the aqueous phase. In addition, other cations generally found in nuclear waste solutions can be tolerated in substantial concentrations, with the exceptions of iron and aluminum, for which the extractants described herein are not selective. Also, cesium and strontium can be extracted, using monoalkylphosphoric acids, from solutions substantially free of other cations, i.e., without the presence of salting agents.

Having described my invention, the following examples are offered to illustrate my invention in greater detail.

Example I 10 ml. of a kerosene solution 0.5 molar in mono(3,9-diethyltridecyl-6)-phosphoric acid were contacted by agitating 10 minutes at room temperature with 10 ml. of an aqueous solution 0.5 molar in $NaNO_3$ and containing 10 p.p.m. cesium-137. At an equilibrium pH of 1.40 the phases were separated and cesium stripped from the organic phase with 1.0 molar nitric acid. The concentrations of cesium extracted by the organic phase and remaining in the aqueous phase were determined. The extraction coefficient, $E_a^o$, for cesium, based on these determinations, was 3.2.

Example II 10 ml. of a kerosene solution 0.1 molar in mono(3,9-diethyltridecyl-6)phosphoric acid were contacted by agitating 10 minutes at room temperature with 10 ml. of an aqueous solution 0.5 molar in $NaNO_3$ and containing 10 p.p.m. strontium-89. At an equilibrium pH of 4.8 the phases were separated and strontium stripped from the organic phase with 1.0 molar nitric acid. The concentrations of strontium extracted by the organic phase and remaining in the aqueous phase were determined. The strontium extraction coefficient was 13.2 and a Sr-Na separation factor of 130 was obtained.

The foregoing description and examples are not intended to restrict the scope of my invention and it should be construed as limited only to the extent indicated by the appended claims.

Having described my invention, I claim the following:

1. A process for recovering metal values selected from the group consisting of cesium and strontium from an acidic aqueous solution containing said values which comprises contacting said aqueous solution with an organic liquid phase comprising a monoalkylphosphoric acid containing from 12 to 17 carbon atoms and adjusting the equilibrium pH of the aqueous solution to a value from 1 to 5, whereby said metal values are transferred to the organic liquid phase, and separating the resulting metal value-loaded organic liquid phase from the metal value-depleted aqueous phase.

2. The process of claim 1 wherein said aqueous solution contains both cesium and strontium values and the pH of the aqueous solution is adjusted to a value from 1 to 2, thereby preferentially extracting cesium values into the oganic phase.

3. The process of claim 1 wherein said aqueous solution contains both cesium and strontium values and the pH of the aqueous solution is adjusted to a value from 2 to 5, thereby extracting strontium values into the organic phase.

4. A process for recovering metal values selected from the group consisting of cesium and strontium from an acidic aqueous solution containing said values together with sodium and nitrate ions which comprises contacting said aqueous solution with an organic liquid phase comprised of an organic diluent and a monoalkylphosphoric acid selected from the group consisting of monododecylphosphoric acid, monotetradecylphosphoric acid, and monoheptadecylphosphoric acid, and adjusting the equilibrium pH of the aqueous phase to a value from 1 to 5 whereby said metal values are transferred to the organic liquid phase; and separating the resulting metal value-loaded organic phase from the depleted aqueous solution.

5. The process of claim 4 wherein said aqueous solution contains both cesium and strontium values and the equilibrium pH of the aqueous solution is adjusted to a value from 1 to 2, thereby preferentially extracting cesium values into the organic phase.

6. The process of claim 4 wherein said aqueous solution contains both cesium and strontium values and the equilibrium pH of the aqueous solution is adjusted to a value from 2 to 5, thereby extracting strontium values into the organic phase.

References Cited by the Examiner

UNITED STATES PATENTS

| | | | |
|---|---|---|---|
| 2,796,320 | 6/1957 | Spedding | 23—312 X |
| 2,907,628 | 10/1959 | Dawson | 23—312 X |
| 3,122,414 | 2/1964 | Korner | 23—312 X |
| 3,179,503 | 4/1965 | Horner | 23—312 |

FOREIGN PATENTS 558,856 7/1957 Belgium.

NORMAN YUDKOFF, *Primary Examiner.*

S. J. EMERY, *Assistant Examiner.*